(12) United States Patent
Feist

(10) Patent No.: US 7,120,917 B2
(45) Date of Patent: Oct. 10, 2006

(54) PROCESS FOR ADJUSTING AN OPERATING INTERFACE BELONGING TO PROCESS DEVICES WITH AN INTERNET CAPABILITY, ALONG WITH AN ARRANGEMENT EXHIBITING SUCH AN OPERATING INTERFACE

(75) Inventor: Fridolin Feist, Oberwolfach (DE)

(73) Assignee: VEGA Grieshaber KG, Schiltach (DE)

( * ) Notice: Subject to any disclaimer, the term of this patent is extended or adjusted under 35 U.S.C. 154(b) by 541 days.

(21) Appl. No.: 10/076,959

(22) Filed: Feb. 19, 2002

(65) Prior Publication Data

US 2002/0116548 A1 Aug. 22, 2002

Related U.S. Application Data

(60) Provisional application No. 60/273,334, filed on Mar. 6, 2001.

(30) Foreign Application Priority Data

Feb. 21, 2001 (DE) ................. 101 08 258

(51) Int. Cl.
*G06F 9/46* (2006.01)
(52) U.S. Cl. .................. 719/330; 715/513; 715/517; 709/217; 709/219
(58) Field of Classification Search ............... 719/330, 719/331, 310; 715/513, 517; 709/219, 217
See application file for complete search history.

(56) References Cited

U.S. PATENT DOCUMENTS

| | | | |
|---|---|---|---|
| 5,381,523 A * | 1/1995 | Hayashi ..................... 715/513 |
| 5,983,227 A * | 11/1999 | Nazem et al. ................ 707/10 |
| 6,005,568 A * | 12/1999 | Simonoff et al. ........... 715/744 |
| 6,182,127 B1 * | 1/2001 | Cronin et al. ............... 709/219 |
| 6,370,582 B1 * | 4/2002 | Lim et al. ................... 709/230 |
| 6,745,368 B1 * | 6/2004 | Boucher et al. ......... 715/500.1 |
| 2001/0056447 A1 * | 12/2001 | Sumino ..................... 707/513 |
| 2002/0116418 A1 * | 8/2002 | Lachhwani et al. ......... 707/517 |
| 2003/0225853 A1 * | 12/2003 | Wang et al. ................ 709/217 |
| 2004/0255233 A1 * | 12/2004 | Croney et al. .............. 715/500 |

* cited by examiner

*Primary Examiner*—William Thomson
*Assistant Examiner*—Phuong N. Hoang
(74) *Attorney, Agent, or Firm*—Nath & Associates PLLC; Gregory B. Kang; Stanley N. Protigal

(57) ABSTRACT

Described is a process for adjusting an operating interface, event messages, and/or measurement protocols belonging to internet-capable process devices, such as control units (13, 23), sensors (14), and/or actuators (15), to given operating conditions, which devices are connected over interfaces (3, 7, 20) and/or networks and form a component in a process control system. Also described is an arrangement with an interface of this kind. Thus, the invention makes possible an adjustment of the operating interface of internet-capable devices, particularly in process control systems, or of event messages and measurement protocols, to new operating conditions, an adjustment that is considerably easier for the user to manage.

13 Claims, 8 Drawing Sheets

Figure 1:
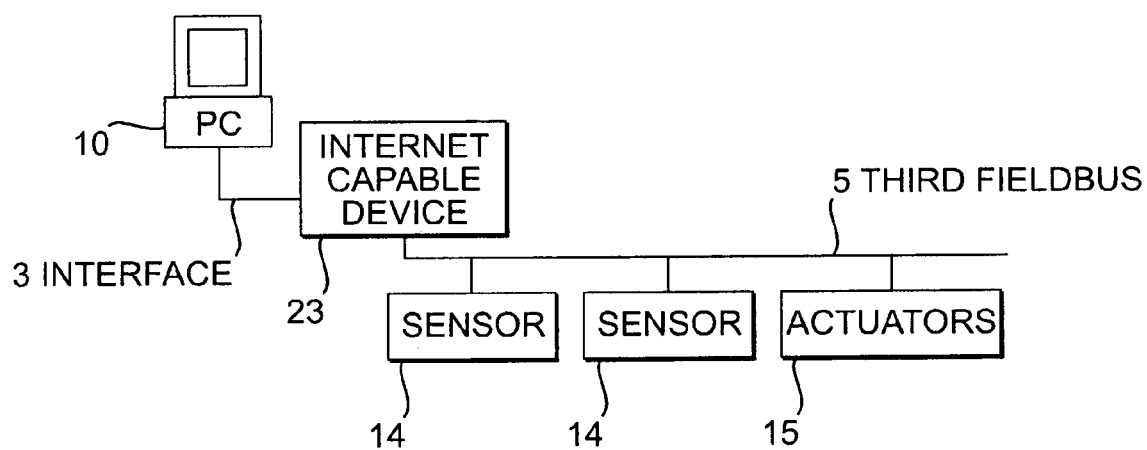

PROCESS FOR ADJUSTING AN OPERATING INTERFACE BELONGING TO PROCESS DEVICES WITH AN INTERNET CAPABILITY, ALONG WITH AN ARRANGEMENT EXHIBITING SUCH AN OPERATING INTERFACE

This application is a non-provisional of U.S. provisional application no. 60/273,334 filed Mar. 6, 2001.

A process for adjusting an operating interface belonging to process devices with an internet capability, along with an arrangement exhibiting such an operating interface.

The invention relates to a process for adjusting an operating interface, event messages, and/or measurement protocols belonging to internet-capable process devices, such as control units, sensors, and/or actuators, to given operating conditions, which devices are connected over interfaces and/or networks, particularly in process control systems; the invention also relates to an arrangement with this kind of operating interface.

Internet technologies are gaining ever greater importance in the industrial environment. A result is that more and more devices contain integrated internet servers. These devices have an advantage in that they are able to operate with protocols and services that are already installed in numerous computers and that are widespread and accepted by users. Access to these machines is provided by the conventional internet (web) browser that is present on almost every PC. Since access can be made easily over the internet, devices of this kind can be addressed from any place in the world and, e.g., diagnosed or "parameterized".

Generally the structure of the internet pages called up in this way is permanently stored in the device, while certain information—for example, information that reproduces the operating status of the devices—can be inserted dynamically when the pages are called up, in accordance with actual conditions.

A basic disadvantage of such configurations is that they are relatively inflexible and that it is relatively difficult or even impossible for the user to adjust the display, i.e., the operating interface, or event messages and measurement protocols, to new operating conditions for the devices. Instead it is generally necessary to shut down the device in order to change the software or firmware. In a few cases the operating interface can only be adjusted by the manufacturer of the process device.

The invention is thus based on the problem of creating a process and a system with which it is considerably easier, particularly for the user, to adjust the operating interface, event messages, and/or measurement protocols of internet-capable devices, particularly in process control systems, to specific operating conditions or to types of display desired by the user.

This problem is solved with a process according to claim 1 and a arrangement according to claim 3.

The secondary claims indicate advantageous elaborations of the invention.

Further details, features, and advantages will emerge from the following description of two preferred embodiments based on the drawing. Shown in the figures are:

FIG. 1 a schematic depiction of a known process control system

Figure 2:
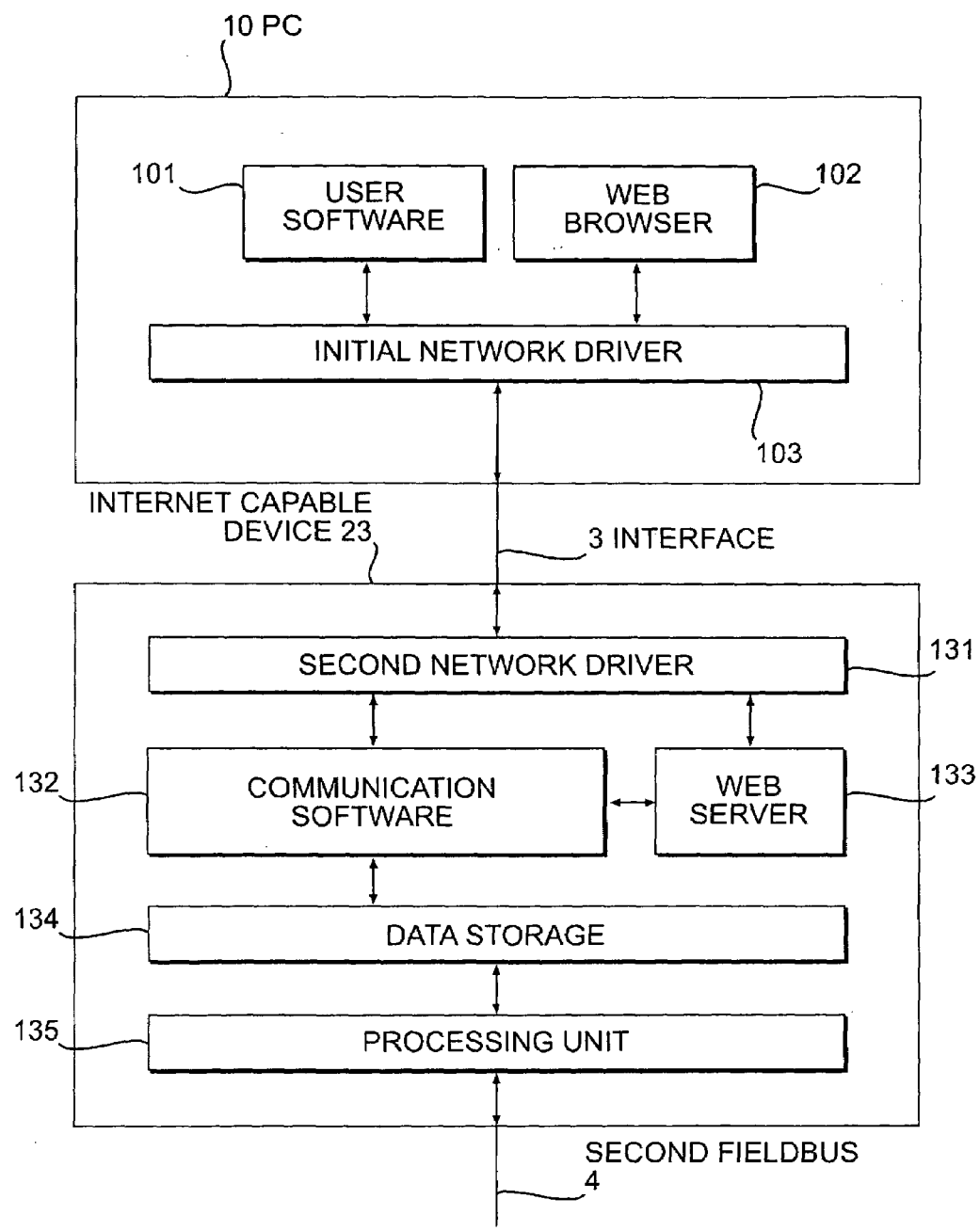

FIG. 2 a detailed depiction of individual components of the system shown in FIG. 1

Figure 3:
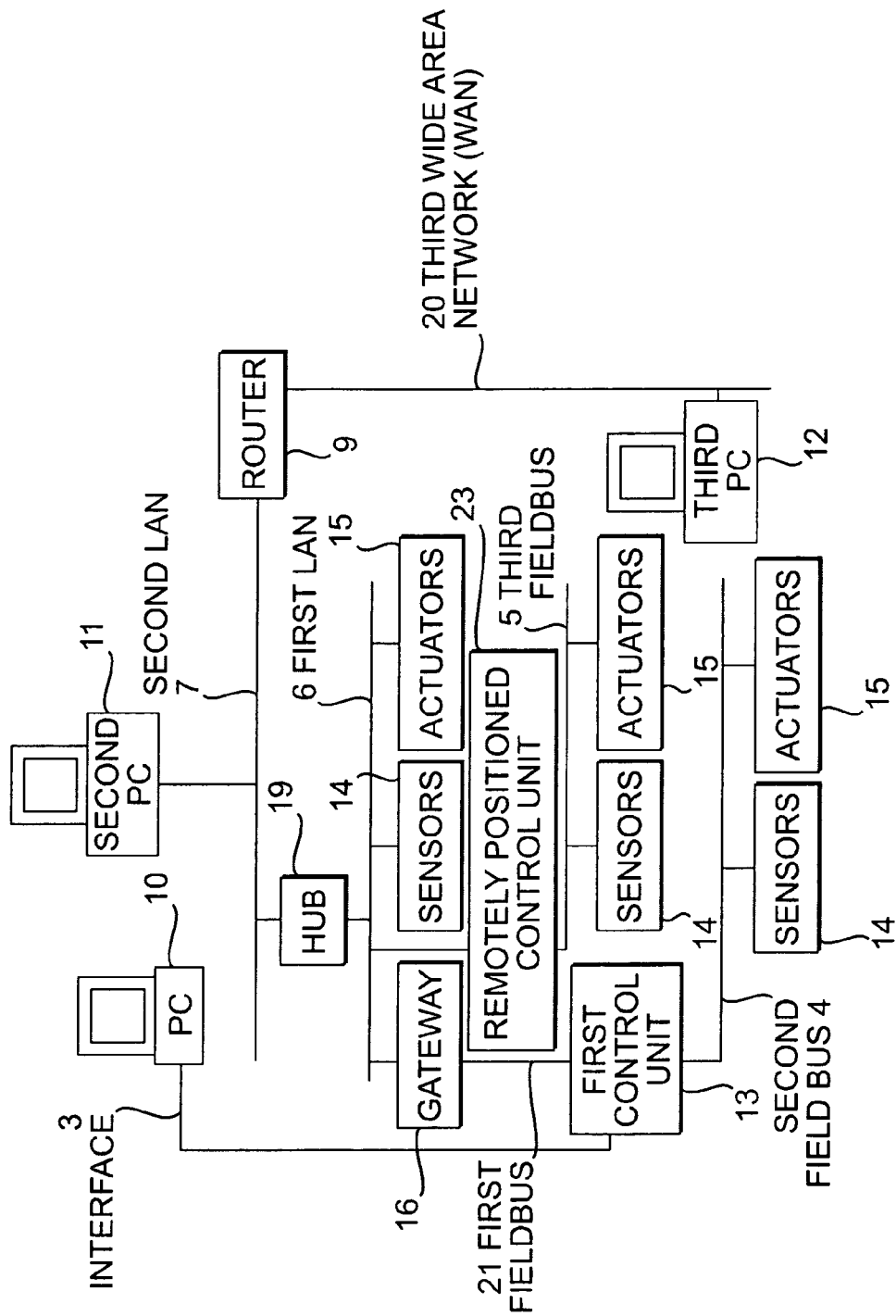
Figure 4:
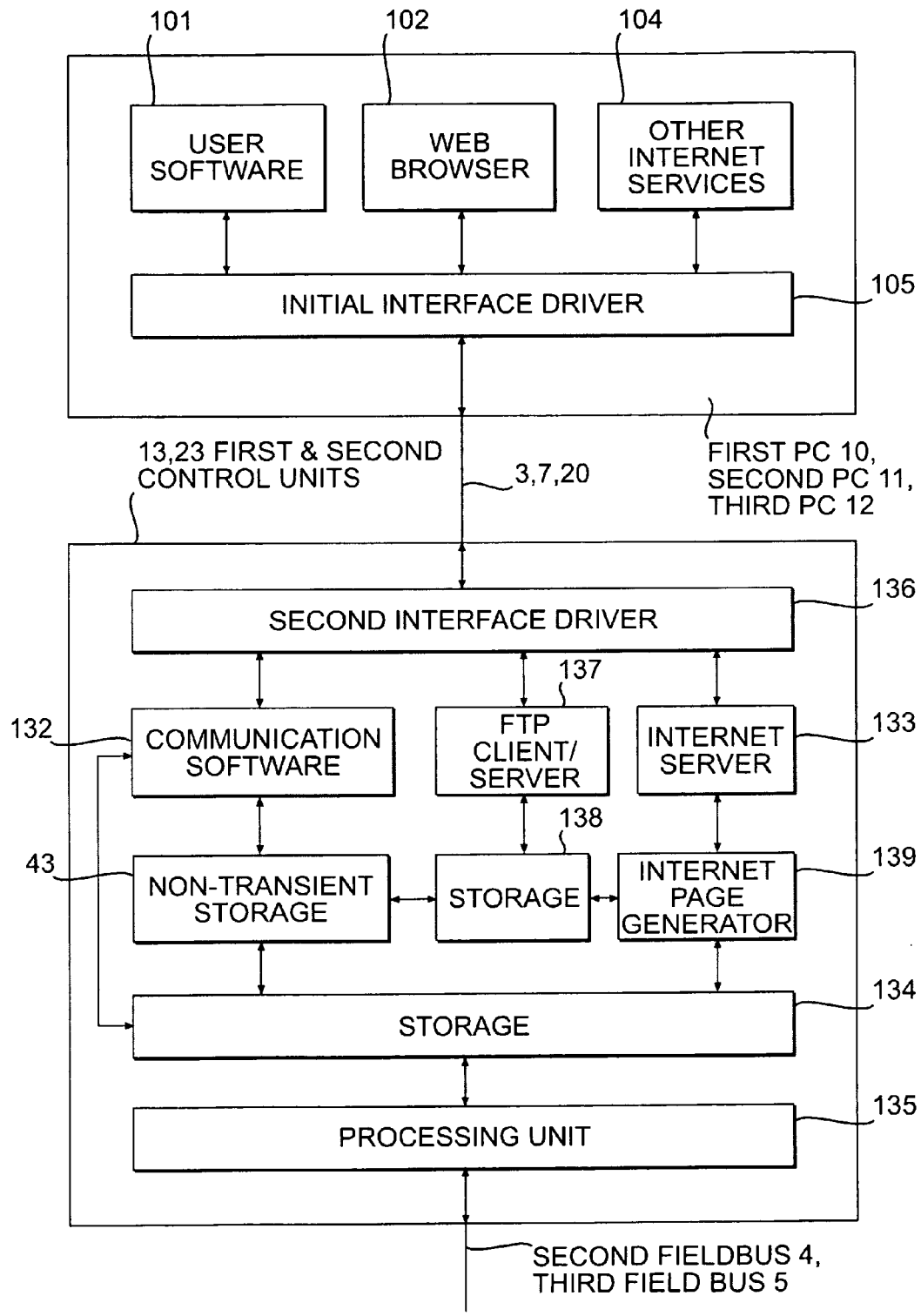

FIG. 3 a schematic depiction of an initial inventive embodiment of a process control system FIG. 4 a detailed depiction of individual components of the system shown in FIG. 3

Figure 5:
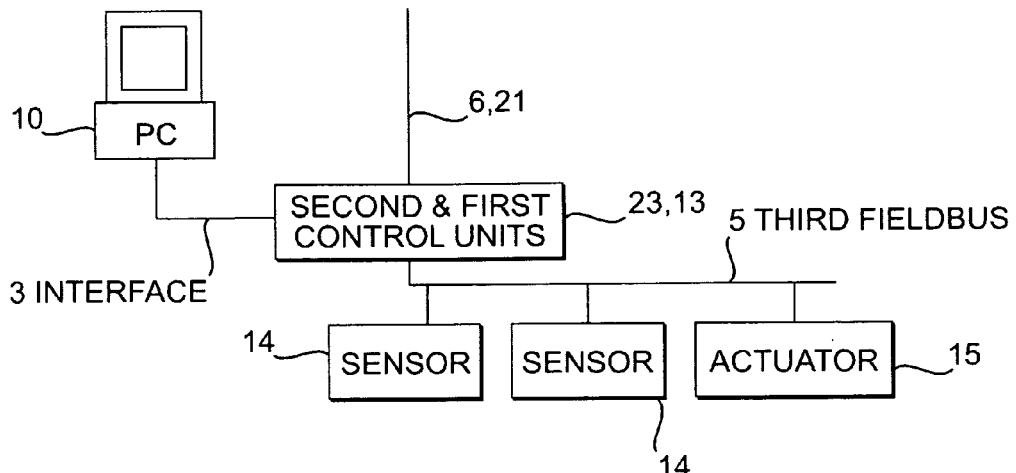
Figure 6:
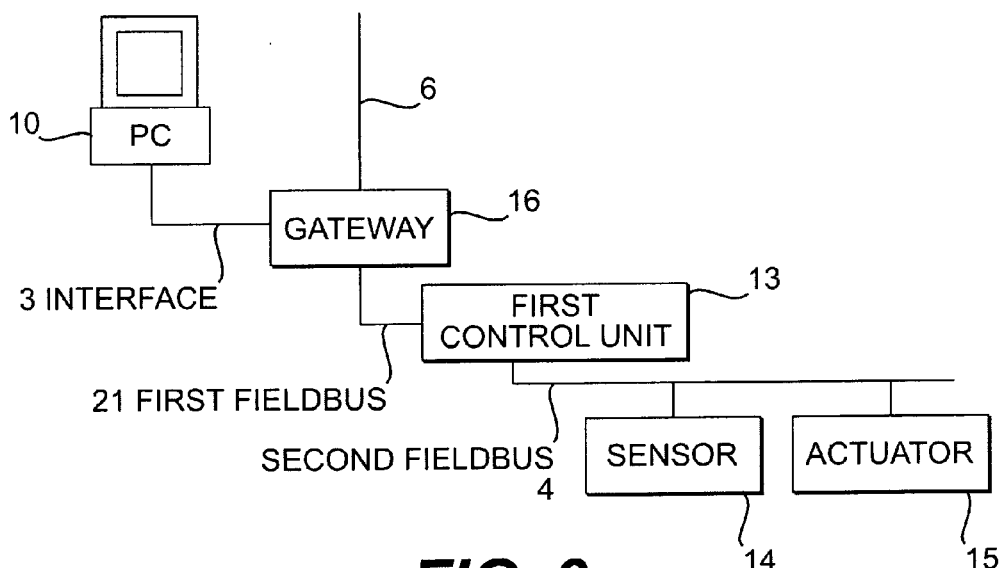
Figure 7:
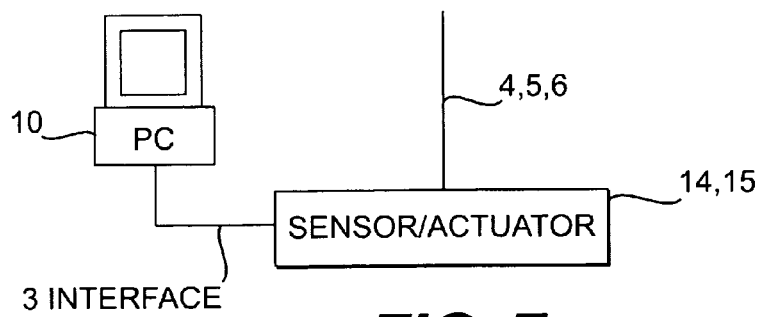
Figure 8:
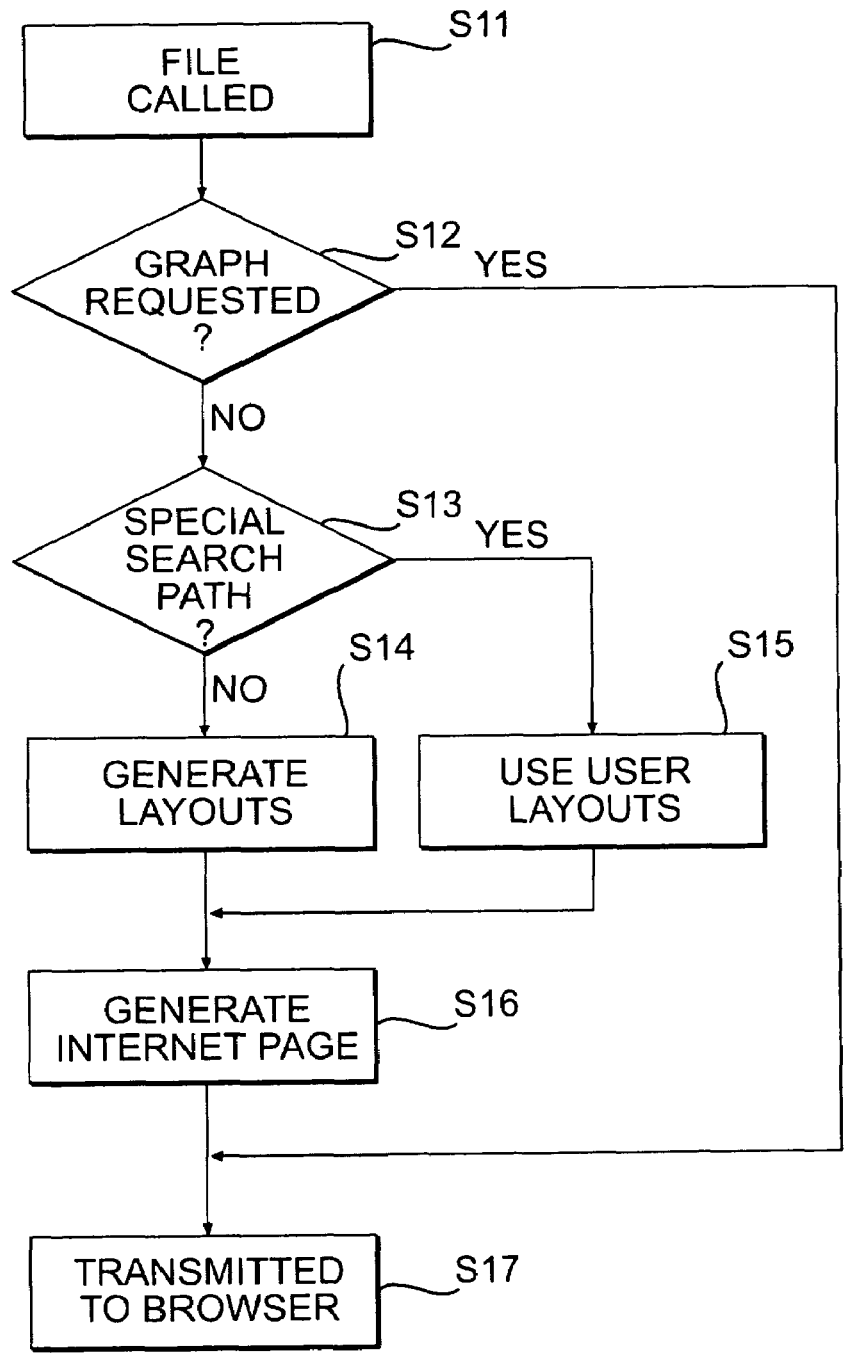
Figure 9:
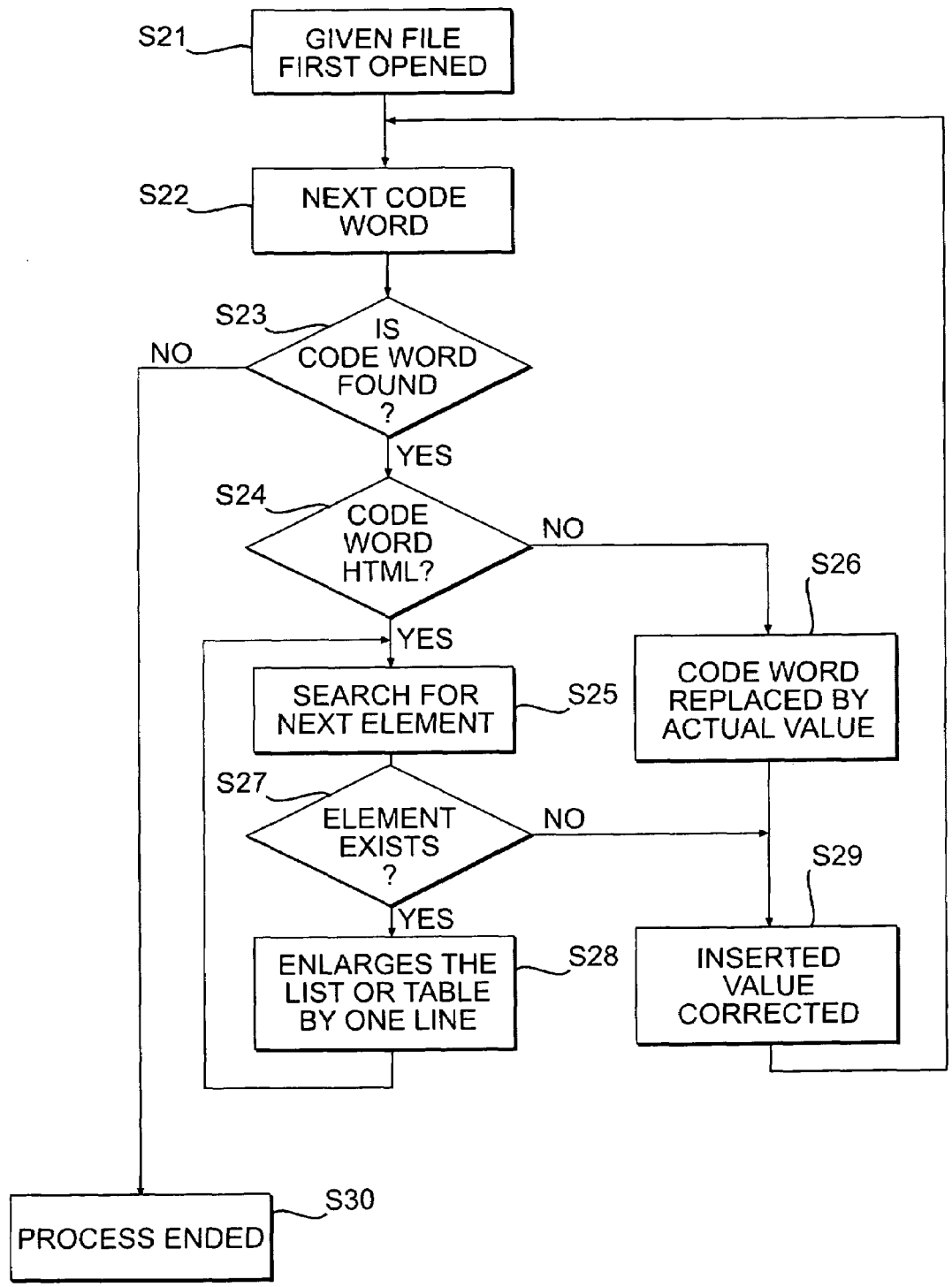
Figure 10:
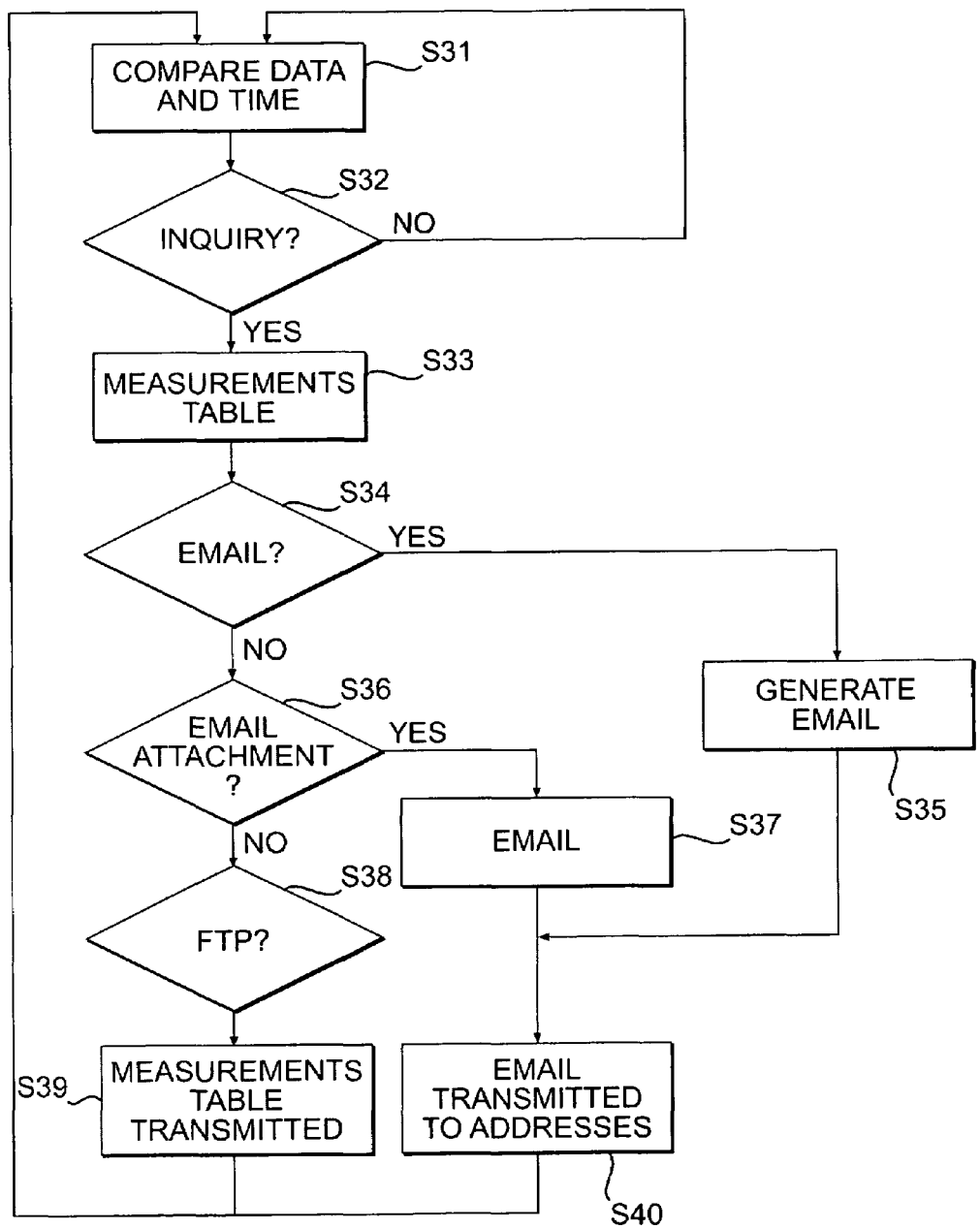

FIG. 5 a schematic partial depiction of a second inventive embodiment of a process control system FIG. 6 a schematic partial depiction of a third inventive embodiment of a process control system FIG. 7 a schematic partial depiction of a fourth inventive embodiment of a process control system FIG. 8 a flow diagram showing the selection of an access path for layouts in the case of user inputs FIG. 9 a flow diagram for the generation of web pages based on the layouts FIG. 10 a flow diagram for the transmission of information according to preconfigured time criteria.

FIG. 1 provides a schematic depiction of a known process control system. The system comprises a PC 10, which is attached over an interface 3 to an internet-capable device 23 (e.g., a small SPS, control unit). The system also includes a plurality of sensors 14 and actuators 15, which communicate over a bus system 5 with an internet-capable device 23 in both directions. The interface 3 is a point-to-point connection and is thus not bus-capable. The interface 3 is usually the parameter-assigning interface for the manufacturer-specific programming tools. The process according to the invention can be implemented in the device 23.

FIG. 2 shows the components of the PC 10 essential in this connection, as well as those of the device 23 for the case in which the device 23 is provided with a web server capability according to the existing art, i.e., exhibits an internet browser based on "hard-coded" web pages.

The PC 10 accordingly contains a user software 101 as well as a web browser 102, which are connected with the interface 3 via an initial network driver 103. Located on pages of the device 23 is a second network driver 131, which is attached to the interface 3. Connected to the second network driver 132 are a communication software 132 and a web server 133, which also communicate with each other. The signals transmitted over the bus system 4 to and from the sensors 14 and the actuators 15 are guided over a unit 135 for signal, measurement, and process-control processing. This unit in turn is connected to a measurement and data storage 134, which the communication software 132 can access. The data can be transmitted in both directions over all of these connections in the PC 10 and the device 23.

As originally indicated, however, a disadvantage here is that the structure of the web pages that can be retrieved in this way is permanently fixed in the devices, and only a small amount of information indicating the status of the devices can be dynamically inserted when the pages are called up.

In contrast, FIG. 3 provides a schematic depiction of an initial inventive embodiment of a process control system. The system comprises an initial PC 10, a second PC 11, and a third PC 12, the three of which can be positioned wherever desired.

The first PC 10 is connected by an interface 3 to a first control unit 13, which can be, e.g., an SPS, a PLS, a remote I/O unit, or an intelligent bus terminal. The first control unit 13 is connected to a gateway 16 by way of a first fieldbus 21 on the process level (e.g., ProfibusDP, Interbus, etc., or a proprietary solution). A connection can be produced over the gateway 16 to the first local are network 6 (LAN), which in the present case is a bus system on the automation level (e.g., ethernet, token ring, etc.).

The first control unit, in turn, is connected by a second bus 4 to a plurality of sensors 14 and actuators 15. The second bus 4, which involves control lines that may optionally conduct bidirectional signals, can be a fieldbus on the field level (e.g., ASI) and may include analog inlets and outlets with 4 to 20 mA, as well as circuit inlets and outlets.

Communication is possible over the first local network 6 with other sensors 14 and actuators 15, as well as with a second, more remotely positioned control unit 23 (for example, an SPS, a PLS, a remote I/O unit or an intelligent bus terminal), which is connected by a third fieldbus 5 on the fieldbus plane (e.g., ProfibusPA, FieldbusFoundation, etc., or a proprietary solution) to other sensors 14 and actuators 15.

The second PC 11 in this system is attached by means of a second local network (LAN) 7. This second network 7 is connected via a router 9 to a third wide area network (WAN) 20, which is connected to the third PC 12. The second network 7 is also connected by way of a HUB 19 with the first local network 6.

The components essential in this connection belonging to the first, second, and third PC 10, 11, 12 and to the first and second control unit 13, 23 are shown in FIG. 4.

The PCs each include a user software 101, a web browser 102, and other internet services 104, which are connected to an initial interface driver 105 for bidirectional communication. This first interface driver 104 produces a connection outwards via the interface 3, the second local network 7, or the wide area network 20.

The first and second control units 13, 23 each include at the entrance a second interface driver 136, which is connected over the interface 3 with the first PC 10 or over the first local network 6, the HUB 19, and the second local network 7 to the second PC 11 and, furthermore, is connected over the router 9 and the third wide area network 20 to the third PC 12.

The second interface driver 136 is bidirectionally connected inside the control unit with a communication software 132, an internet server 133, and an FTP client/server 137. The control unit furthermore comprises a storage 134 for measurements and data which communicates bidirectionally with the communication software 132 and with a processing unit 135 for signals, measurements, and processes. The unit 135 is connected to the second or third bus 4, 5, which permits bidirectional communication with the sensors 14 and the actuators 15.

The control unit 13, 23 also includes an internet page generator 139, which can provide the desired layouts with actual values and in each case is bidirectionally connected to the internet server 133, the storage 134 for measurements and data, and a storage 138 for desired layouts of internet pages. The storage 138 is bidirectionally connected to the FTP client/server 137 and a non-transient storage 43, which is also used for storing desired layouts and for its own part is bidirectionally connected to the communication software 132.

The internet pages produced with the generator 139 are fed to the web server 133, which is connected to the second interface driver 136. The storage 138 stores not only layouts but also manages them in a RAMDISK, in which the same format is used as in a RAMDISK or a PC hard disk. Thus it becomes very simple to copy, delete, move, and generate data files with the tools that are commonly used in current PC technology.

All connections within the PCs 10, 11, 12 and the control units 13, 23 permit bidirectional communication between the connected components.

In this embodiment the sensors 14, actuators 15, and the control units 13, 23 are digitally communicating devices which are interconnected by the specified networks 7, 20 (LAN, WAN), or router 9, so that they can be located at the desired sites. The devices form networked process control systems which support internet protocols and internet services and which exhibit the non-transient storage 43, in which simple HTML data files and graphics can be stored during operation.

FIG. 5 schematically depicts a portion of a second invention embodiment of a process control system. Here, in contrast to the first embodiment, the first and second control units 13, 23 are combined and are connected jointly to the first PC 10 via the interface 3. Furthermore, the two control units communicate jointly by way of the first local network 6 and the first fieldbus 21 to the components shown in FIG. 3 and are connected by the third fieldbus 5 to the sensors 14 and the actuators 15.

FIG. 6 schematically depicts a portion of a third invention embodiment of a process control system. Here, in contrast to the first embodiment, the gateway 16 is directly connected to the first PC 10 by way of the interface 3. Also attached to the gateway 16 is the first local network 6 and the first fieldbus 21, which is connected to the first control unit 13. The latter communicates in turn with sensors 14 and actuators 15 by way of the second bus 4.

Finally, in the portion of a fourth invention embodiment depicted schematically in FIG. 7 the first PC 10 is connected directly by the interface 3 to sensors 14 and actuators 15. As in the first embodiment shown in FIG. 3, these sensors 14 and actuators 15 communicate with the given components via the second bus 4, the third fieldbus 5, and the first local network 6.

The design, formation, and structure of these pages can be determined on one of the PCs according to the wishes of the system operator and are transferred individually into the individual devices before or during operation of the system. Certain points on these pages, which are supposed to contain status information on process variables or process parameters, can be marked by means of definite code words. The operator of the system thus has the opportunity to create an interface to his devices by selecting suitable graphic elements, ones which correspond, e.g., to certain in-house display forms. In addition, he can influence the contents of the pages in such a way that only those contents which are of interest to him actually appear. The client-specific data files produced in this way can be transmitted to the devices with the customary internet services (FTP transfer) over the described networks (LAN, WAN) and bus systems, or over another desired interface present in the device; in those destination devices the files are then stored in non-transient form.

If the devices discover contents in the provided storage areas, these contents are automatically interpreted and are converted with the web page generator 139 into new HTML pages which precisely accommodate the display forms of the layouts. If necessary, the code words in the newly produced HTML pages are replaced by current relevant information. Thus, constructs in the form of tables or lists, e.g., for the display of process variables, need be applied to the layout only once. The devices involved will automatically enlarge these constructs by the number of existing process variables.

In addition to the layout for a message, second layouts can be stored containing only lists or table constructs. These second layouts employ simple file formats which are suitable directly for further processing in the process control systems and are added to the report in the form of an appendix.

With HTML pages as a layout, the devices configured in this way allow the operator to employ simple and generally available means to inexpensively realize his own display forms for information pages or operating elements, ones which can be called up with a conventional web browser. The information pages indicated here may contain information on the system itself, as well as data on its operating state and measurements of process variables. The system devices configured in this way provide the capacity for continuously adapting the system to new circumstances over its entire operating life.

To prevent problems that may arise through the storage of erroneous HTML pages in the devices, the devices are delivered with prepared pages which cannot be manipulated by the system operator. Depending on the URL (Uniform Resource Locator) address with which the system user addresses the devices when calling up the web browser, the device will alternately reproduce the pages with which the devices were delivered and the client-specific pages. The user may apply employ a number of different sites, however. That is, divergent informational contents can be called up from a number of different URLs.

This assures that the information available in the device can be called up at any time.

This process, which permits the internet pages of devices in process control systems to be individually modified while in operation, can also be transferred to other internet services. For example, in these devices it is possible to store the layouts for faxes or emails which are only transmitted when certain events occur, as a function of the configuration. Such events might be, e.g., the exceeding of certain measured values, the generation of disturbance messages in the system, or the arrival of certain process states. It is also the case that the indicated fax or email layouts can be provided with code words that are replaced by the device with actual values when the layouts are sent.

For certain application it is useful, e.g., to append to the emails certain files that are generated in the devices themselves. For example, these files can be pure ASCII files which contain system measurement protocols in tabular form. One of the advantages of email transmission is that such messages can be delivered to any addressee without the authorization of a network administrator.

Another possibility consists in automatically sending data to certain servers at certain times, e.g., process control computers. For this service, an FTP client will ideally be realized in the devices described here. This FTP client can independently produce an FTP connection to a server (process control computer) on the basis of the configurations stored in the device, then transfer the files, and finally dissolve the connection.

Another application of the invention represents the flexible adjustment of an operating surface for the described devices. Instead of the already indicated information pages, it is possible to modify process variables on the HTTP. Moreover, not only pure HTML tags but also JAVA scripts and CGIs (Common Gateway Interface) can be employed for the individual design of the web page of these devices.

By way of example, the process for selecting an access path for layouts when user inputs are made with an internet browser will now be described, as based on the flow diagram shown in FIG. 8.

In step S11 a file is called up by the internet browser from an internet address (URL). In step S12 an inquiry is made as to whether the requested file is a graphic. If this is not the case and if no special search path is given in the inquiry made in step S13, the layouts are generated in accordance with step S14 from the standard layouts and, in step 16, the internet pages are generated on the basis of these layouts.

Then in step S17 the generated and requested file is sent to the internet browser transmitting the request.

If a graph is requested in the inquiry according to step S12, the graph is immediately transmitted to the internet browser in accordance with step S17. If the inquiry in step S13 provides a special search path, user layouts will be employed as per step S15, and the internet pages will be generated in step S16 on the basis of those layouts and transmitted in accordance with step S17.

FIG. 9 shows a flow diagram for generating web pages on the basis of layouts; here the code words are replaced and lists or tables are expanded dynamically as dependent on available process images or on a device configuration. FIG. 9 also shows the basic processes for generating event messages, emails, and measurement protocols; here the layouts for these tabular constructs likewise use the syntax for HTML pages.

In step S21 the given file is first opened, and the access indicator is positioned on "beginning". In step S22 the next code word is sought. If a code word has been found in the inquiry under step S23, an inquiry is made in step S24 as to whether this code word lies within the HTML tags for lists or tables. If this is the case, in step S25 a search is performed for the next configured element in the process image. If the inquiry made in step S27 finds such an element, step S28 enlarges the list or table by one line, and the code words contained in the line are replaced by values of the element. This process is then repeated by returning to step S25.

If no further element is found in the search for the next configured element in the process image according to step S25 and the inquiry according to step S27, the access indicator on the "end" of the inserted values is corrected in step S29, and the process is repeated by returning to step S22 (search for the next code word).

If a code word is not found in step S23 the process is ended in accordance with step S30. If a code word is found, but the code word does not lie within the HTML tags for lists or tables according to the inquiry made in step S24, the code word is replaced by an actual value in step S26, e.g., a measurement, a parameter, etc., and the process is continued with step S29 (access indicator on "end" of the inserted values is corrected) and concluded with the repetition of the procedure in step S22 and the search for the next code word.

Finally, FIG. 10 shows a flow chart for the transmission of information according to preconfigured time criteria, i.e., according to fixed intervals of time or programmable deadlines.

To this end, the actual value of the data and time is first compared in step S31 to the intended values configured for automatic transmission. If according to the inquiry in step S32 the actual value is identical to the intended value, a measurements table based on layouts is generated in step S33. Then an inquiry is made in step S34 as to whether the transmission should be made as an email. If this is the case, an email is generated in step S35 on the basis of email layouts and the measurements table is incorporated accordingly. Then the email is transmitted to the addressees in step S40, and the process is repeated by returning to step S31.

If the inquiry in step S34 is answered with "no", an inquiry is made in step S36 as to whether the transmission should be made as an attachment to an email. If this is the case an email is generated on the basis of email layouts, and the measurements table is appended as an attachment. The email is then transmitted to the addressees in step S40, and the process is repeated by returning to step S31. If the inquiry in step S36 is answered with "no", an inquiry is made in step S38 as to whether the transmission should be made to an FTP server. If this inquiry is answered with "yes", a connection with the given FTP server is made in step S39 and the measurements table is transmitted. The process can then be repeated by returning to step S31.

Even if the emphasis in the above description with respect to access possibilities lies mainly on the use of PCs which communicate, or exchange data, over one of the indicated networks using internet services, the presence of such of a network is not at all required. On the contrary, the exchange of data with the PCs can also take place directly over any other interface between the process devices (i.e., sensors, actuators, gateways, control units) and the PCs. Furthermore, the PCs can be attached to bus systems over which internet protocols are not typically transmitted.

The invention claimed is:

1. A process for adjusting at least one of an operating interface, event messages, and measurement protocols of internet-capable process devices, which devices are connected by means of at least one of interfaces networks, to actual operating conditions, wherein the following process steps are involved:
    the storage of data files in each device, and the use of the data files as layout in generating an adapted internet page when an email or FTP file is are transmitted over FTP client services, in answering an inquiry made by a remote internet browser, or upon occurrence of pre-defined events,
    wherein the layouts for the adjusted internet pages and for the adapted emails or measurement protocols contain code words to which actual data are assigned in the reply to inquiries from a remote internet browser, and
    wherein special code words are provided for HTML constructs such as lists and tables and are entered in the layout and automatically copied in the device during its operation, while duplication is performed according to the number of existing bits of information or the number of process variables explicitly listed in the code word.

2. A process according to claim 1, wherein the file serving as layout is an HTML file or any other file and is addressed by an FTP internet service and transmitted to the device.

3. A process according to claim 2, wherein the transmission of the files into the devices takes place during the ongoing operation of the process devices.

4. A process according to claim 2, wherein a standard operating surface or an adjusted operating surface can be selectively activated by the choice of address.

5. A process according to claim 4, wherein the standard operating surface can make available diagnostic aids for error functions that have arisen in the adjusted operating surface.

6. A process according to claim 1, wherein the transmission of emails for the adjustment of at least one of event messages and the transmission of FTP files for the adjustment of measurement protocols is triggered automatically by events such as the reaching or exceeding of predetermined measured values and the appearance of predetermined status messages (such as error, process state, etc.).

7. A process according to claim 1, wherein the transmission of emails for the adjustment of at least one of event messages and the transmission of FTP files for the adjustment of measurement protocols is triggered in cyclical fashion at fixed, predetermined intervals or at predetermined times, as dependent on configurations that have been executed.

8. An arrangement for implementing the process according to claim 1, wherein the devices (13, 14, 15, 23) exhibit an internet server (133), an internet page generator (139), a layout storage (43, 138) for internet pages, FTP client/server units (137), and at least one interface suitable for digital communication.

9. An arrangement according to claim 8, wherein the devices (13, 14, 15, 23) include at least one interface (3 to 7, 20) suitable for digital communication, means for processing internet protocols, internet services, such as those for communication over internet browsers, at least one of email services and FTP client services, as well as means for storing data files with standard tools as layouts in a file system and for safeguarding the files in a non-transient storage area.

10. An arrangement according to claim 9, wherein the digital interface for entering the layout files and the interface for networking the devices are identical.

11. An arrangement according to claim 9, wherein a separate interface is provided for entering the layout files.

12. A process according to claim 1, wherein the internet-capable process devices include one of control units, sensors, and actuators.

13. A process according to claim 1, wherein the storage of data files in each device includes storing of data files with standard tools associated with the data file.

* * * * *